(12) United States Patent
Vatland et al.

(10) Patent No.: US 8,184,782 B1
(45) Date of Patent: May 22, 2012

(54) METHOD AND APPARATUS FOR PROCESSING VOICE CALLS

(75) Inventors: Danny James Vatland, Chanhassen, MN (US); Dean S. Anderson, Cologne, MN (US)

(73) Assignee: Healthsense, Inc., Mendota Heights, MN (US)

( * ) Notice: Subject to any disclaimer, the term of this patent is extended or adjusted under 35 U.S.C. 154(b) by 0 days.

(21) Appl. No.: 10/666,537

(22) Filed: Sep. 17, 2003

(51) Int. Cl.
*H04M 1/64* (2006.01)
*H04M 11/00* (2006.01)

(52) U.S. Cl. ............ 379/88.23; 379/70; 379/88.13; 379/88.17

(58) Field of Classification Search .......... 379/68, 379/70, 88.13, 88.22
See application file for complete search history.

(56) References Cited

U.S. PATENT DOCUMENTS

| | | | | |
|---|---|---|---|---|
| 6,005,870 A * | 12/1999 | Leung et al. | ............ | 370/466 |
| 6,160,877 A * | 12/2000 | Tatchell et al. | ............ | 379/197 |
| 6,347,136 B1 * | 2/2002 | Horan | ............ | 379/142.01 |
| 6,445,694 B1 * | 9/2002 | Swartz | ............ | 370/352 |
| 6,661,879 B1 * | 12/2003 | Schwartz et al. | ............ | 379/88.25 |
| 6,785,379 B1 * | 8/2004 | Rogers et al. | ............ | 379/265.02 |
| 6,792,093 B2 * | 9/2004 | Barak et al. | ............ | 379/202.01 |
| 6,987,841 B1 * | 1/2006 | Byers et al. | ............ | 379/88.17 |
| 7,366,292 B2 * | 4/2008 | Tiliks et al. | ............ | 379/221.09 |
| 7,441,027 B2 * | 10/2008 | Malik | ............ | 709/224 |
| 7,499,537 B2 * | 3/2009 | Elsey et al. | ............ | 379/218.01 |
| 7,808,671 B1 * | 10/2010 | Kirchhoff et al. | ............ | 358/1.15 |
| 7,869,076 B1 * | 1/2011 | Trandal et al. | ............ | 358/1.15 |

* cited by examiner

*Primary Examiner* — Joseph T Phan
(74) *Attorney, Agent, or Firm* — Brooks, Cameron & Huebsch, PLLC

(57) ABSTRACT

The present disclosure relates to a method and apparatus for processing voice calls. One exemplary embodiment of the present invention is a call recording method for allowing a subscriber to selectively record a call made to the subscriber from callers. The method includes receiving a call at an enhanced service platform from a caller using a telephone number associated with the subscriber. Included is accessing a database associated with the subscriber to determine recording preference and call destination preference. Also included is routing the call based on the call destination preference wherein the enhanced service platform records call voice content in the subscriber data storage area.

11 Claims, 8 Drawing Sheets

ENHANCED SERVICES PLATFORM

Call/Voice Mail Options

| | |
|---|---|
| Transfer incoming calls to | [ My Primary Number ] ~56 |
| Telephone Access Code | [ 1234 ] ~58 |

Voice Mail Notifications

| | |
|---|---|
| EMail Address | [ dan_vatland@verscient.com ] ~60 |
| Text Messaging Mobile Number | ( 612 ) 730 - 9244 ~62 |
| Mobile Service Provider | [ Sprint ] ~64 |

Personal Converser Number(PCN) Incoming Calls

66 —○ Screen* & connect to My Primary Number

68 —● Direct Connect to My Primary Number

72 —☐ Announce    ☑ Record —70

Auto-Attendant Incoming Calls

66 —○ Screen* & connect to My Primary Number

68 —● Direct Connect to My Primary Number

72 —☑ Announce    ☑ Record —70

*(Screen options are connect, record & connect, or send to voice mail.

[ Save ] [ Ca

FIG 3

| | | | | |
|---|---|---|---|---|
| ○ | Business | (612) 730 - 9244 | Until Answered ⇕ | Delete |
| ☏ | Business | (952) 941 - 4031 | 4 ⇕ | Delete |
| ○ | Mobile | (612) 327 - 2744 | Until Answered ⇕ | Delete |
| | ⇕ | ( ) - x | Until Answered ⇕ | |

74

Call/Voice Mail Options
View Options
Personal Information
My Phone Numbers
Change Password My Company's Auto Attendant Number    (952) 400 - 0160
My Personal Converser Number(PCN*)    (952) 400 - 0161

*(PCN is a phone number to receive and make Converser™ calls.)

*(Minimum number of rings before transferring to voice mail.)

Save    Cancel

When a caller is on hold play: ● Ads or ○ Music   106

[Ring] [Group, Sales] at least [3] times befoRE forwarding caller to the Auto-Attendent Menu.

108

110

Auto-Attendent Menu

| Digit | Action | User |
|---|---|---|
| 0 | Disabled | (none) |
| 1 | Transfer To | Group, Sales |
| 2 | Transfer To | Smith, Lance |
| 3 | Transfer To | Keen, Brad |
| 4 | Transfer To | Stanley, Brenda |
| 5 | Disabled | (none) |
| 6 | Disabled | (none) |
| 7 | Disabled | Anderson, Susan |
|   |   | Group, Sales |
| 8 | Transfer To | ✓ Johnson, Joe |
| 9 | Disabled | Keen, Brad |
|   |   | Smith, Lance |
|   |   | Stanley, Brenda |

FIG 8

METHOD AND APPARATUS FOR PROCESSING VOICE CALLS

BACKGROUND OF THE INVENTION

Even with the advent of the Internet, vast amounts of information are still being conveyed today by voice. Voice has the advantages of being personable, flexible, fast, and with the advent of cell and satellite phones, these conversations are capable of being accomplished from almost any location in the globe.

A problem associated with transfer of information by voice is that this information must be transcribed. Transcription is a process that involves the human element and is therefore a source of error. This error can be on either end of the conversation and result from problems such as pronunciation, hearing, and perception, just to name a few. On top of these problems, add distractions such as driving or walking at the same time, which are common tasks that must be managed by the typical cell phone user. These additional tasks can prove to be a distraction to the participants of the voice conversation. Conversely, the conversation can also prove to be a distraction to one performing these additional tasks. The conversation, if too distracting, may even pose a danger to one attempting to perform these additional tasks.

In cases where accuracy is important, a record of the voice conversation would be helpful. Where the information that is conveyed is either complex, unfamiliar, difficult to remember, or is presented in a manner that makes it difficult to record the information, a record of the conversation would be helpful. Difficulty in recording conversations may result from calling from a location where recording information is difficult such as when calling from a cell phone while driving. A record of the conversation in this case would be helpful to refer back too.

Previously, in cases where it was crucial that information was transcribed accurately, such as in brokerage firms and banks, all conversations with customers were routinely recorded. This information was not intended to be referred to by users of the system on a day-to-day basis, but instead was intended to be available only if something went wrong. In this case, these phone records could be painstakingly retrieved.

There is a present need for systems for recording voice conversations and organizing these voice data files and storing them in a manner that allows them to be readily accessed. These voice-recording systems should not require large capital expenditures on hardware or software and should be compatible with existing technologies. Finally, these voice-recording systems should be reliable and easy to operate so that these systems can seamlessly be integrated into a wide variety of different applications.

SUMMARY OF THE INVENTION

The present invention relates to a method and apparatus for processing voice calls. One exemplary embodiment of the present invention is a call recording method for allowing a subscriber to selectively record calls made to the subscriber from callers. The method includes receiving a call at an enhanced service platform from a caller using a telephone number associated with the subscriber. Included is accessing a database associated with the subscriber to determine recording preference and call destination preference. Also included is routing the call based on the call destination preference wherein the enhanced service platform records call voice content in a subscriber data storage area of the database.

Another aspect of the exemplary embodiment of the present invention is a call recording method for allowing a subscriber to selectively record a call made by the subscriber. The method includes receiving a call at an enhanced service platform from the subscriber using a telephone number associated with the subscriber. Included is authenticating the subscriber. Also included is routing the call based on the subscribers input wherein the enhanced service platform records call voice content.

Yet another aspect of the exemplary embodiment of the present invention is a call recording method for allowing a selected subscriber from a plurality of subscribers to record a call made to the selected subscriber from a caller. The method includes receiving a call at an enhanced service platform from the caller using a telephone number associated with the selected subscriber. Included is accessing a database associated with the selected subscriber to determine recording and destination preference. Also included is recording call content based on recording preference and delivering the recorded call voice content to a data storage area.

Still another aspect of the exemplary embodiment of the present invention is a recording method for allowing a subscriber of a plurality of subscribers to record a call made to the subscriber from a caller. The method includes receiving a call at an enhanced service platform from the caller using a telephone number associated with the plurality of subscribers. Included is selecting the subscriber from the plurality of subscribers based on caller input. Included is accessing a database associated with the selected subscriber to determine recording and delivery preferences. Also included is recording call content based on recording preference and delivering the recorded call voice content based on the call delivery preference.

BRIEF DESCRIPTION OF THE DRAWINGS

FIG. 3 is a diagram of an exemplary graphical user interface of a call management procedure for configuring the reporting preferences associated with the subscriber.

FIG. 4 is a diagram of an exemplary graphical user interface of a call management procedure for configuring the call designation preference associated with the subscriber.

FIG. 6 is a diagram of an exemplary graphical user interface of a call management procedure for delivering call voice recording data associated with a particular caller to a particular subscriber for data location.

FIG. 8 is a diagram of an exemplary graphical user interface of a call management procedure for setting up the subscriber preference for call transfers using the auto attendant method described in FIG. 7.

DETAILED DESCRIPTION OF THE PREFERRED EMBODIMENTS

Figure 1:
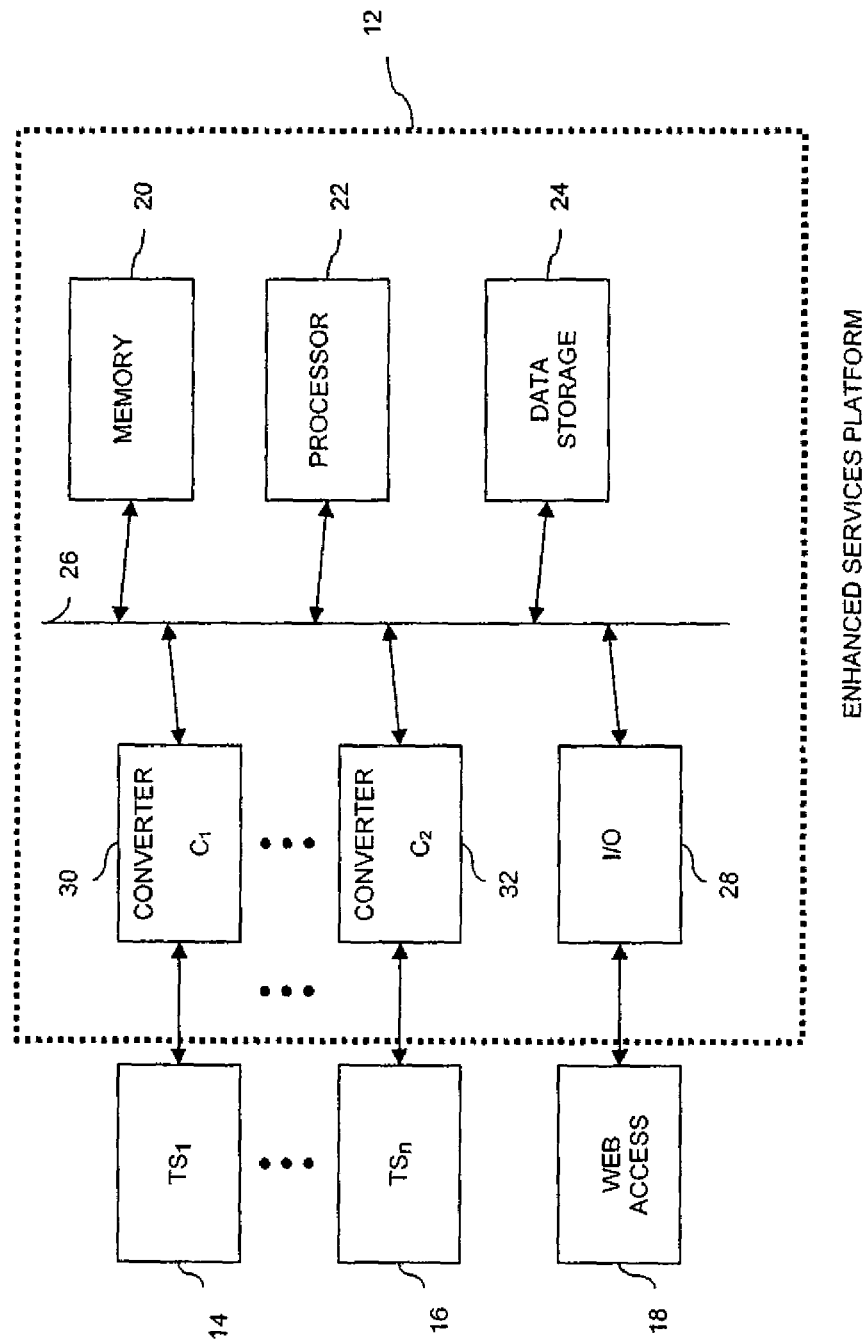
FIG. 1 is a block diagram that includes the Enhanced Services Platform that embodies the call processing method of the present invention.

FIG. 1 is a block diagram of an exemplary embodiment of the Enhanced Services Platform (ESP) 12 and embodies the call processing techniques of the present invention. The ESP 12 is in communication with one or moretelephony services 14 and 16, which are designated ts1 through $ts_n$, respectively. In addition, ESP 12 also communicates with a web access device 18.

The telephony services 14 and 16 can be one or more types of telephony services that communicate with the ESP 12. These telephony services can be either analog or digital services. Some examples of telephony services include Plain Old Telephony Service sometimes referred to as POTS, which is an analog service. Digital services include T1, ISDN, PRI, T1, CAS, just to name a few.

The ESP 12 includes a memory 20, a processor 22, data storage 24, a system bus 26, and Input/Output (I/O) device 28. The processor 22 executes instructions stored in the memory 20 to perform the methods of the present invention for managing voice data. Control and data information are passed between elements within the ESP on the system bus 26. Voice data is stored on the data storage device 24 which is preferably a persistent storage device.

Inbound calls to the ESP 12 are through converters 30 and 32 designated C1 $C_n$, respectively. C1 is connected between the telephony service 14 and the system bus 26. Similarly, converter $C_n$ 32 is connected between the telephony service 16 and the system bus 26. Voice data and caller ID information provided by the telephony service 14, 16, is converted by the corresponding converter 30, 32 to digital voice data and caller information data for processing by the processor 22. The processor 22 in performing the methods of the exemplary embodiment of the present invention, selectively stores voice data to the data storage device 24 according to the method of the present invention.

Voice data stored on the data storage device 24 is accessed through the telephony services 14 through 16 whereby under the control of the processor 22, voice data and data storage 24 is provided to the system bus 26 whereby a converter 30, 32, corresponding to a telephony service 14, 16, accessing the voice data converts this digital data to a data stream compatible with the telephony service 14, 16.

Alternatively, voice data stored on the data storage device 24 can be accessed through an I/O device 28 connected to system bus 26. The I/O device 28 is connected to an information channel such as a web access device 18. The web access device 18 allows subscribers to access voice data stored in the data storage device 24 under processor control 22. The I/O device 28 converts data on the system bus 26 to a compatible format for the web access device 18. In one exemplary embodiment, the web access device 18 is an Ethernet and the I/O device 28 converts data from the system bus to an Ethernet format. The methods performed on the ESP 12 will be discussed in more detail with respect to FIGS. 2 through 8.

Figure 2:
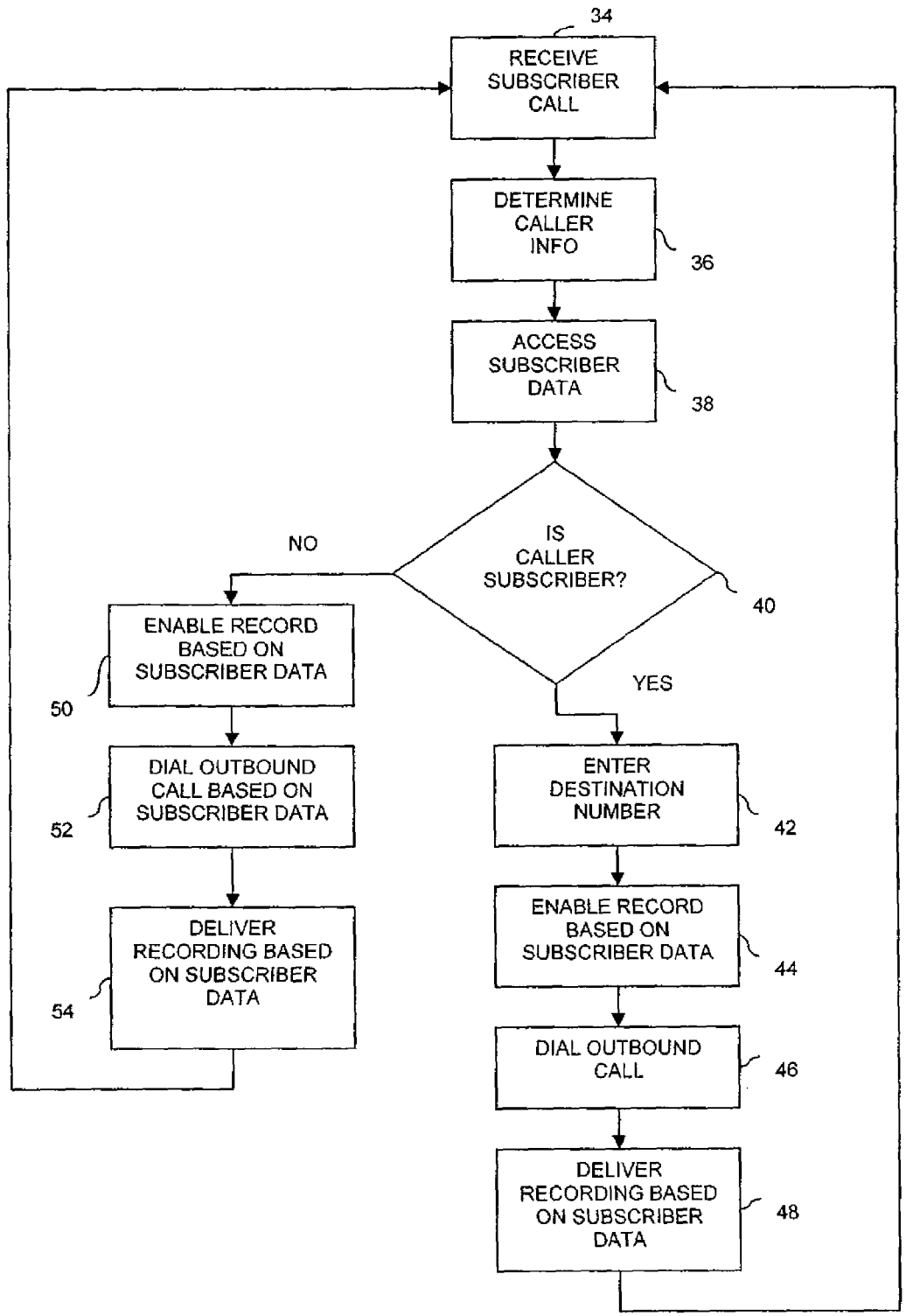
FIG. 2 is a flow diagram illustrating both the recording of inbound call conversations as well as the recording of outbound call conversations.

FIG. 2 is one exemplary embodiment of a method of the present invention for managing voice calls that are inbound or outbound to the ESP 12. Included in this method for managing voice calls is a method for recording voice content of the call and storing this voice content in the data storage device 24, shown in FIG. 1. The voice content of a call referred to herein includes all voice data that is detected during the call. In the case of a call having a source speaker and a designation speaker, the voice content includes the conversation between the source and destination speakers. In the case where a call terminates at the ESP 12, all voice data is received from the source speaker or speakers.

The method begins with the receipt of a subscriber call as represented by 34 in FIG. 2. This call is received on a telephone number that is associated with the subscriber. The call comes in from the telephony service 14, 16 as described in FIG. 1. The ESP 12 determines caller identification information. Calls that are encoded with caller information include a telephone number of the call source as well as a name assigned to that telephone number. This telephone number and name information may be used to identify the caller.

Subscriber data associated with the Personal Call Number (PCN) associated with the subscriber is then accessed as represented by 38. Each subscriber is assigned a password for accessing the ESP 12 as well as receiving calls from non-subscribers for handling by the ESP 12. The ESP 12 then determines whether the caller is a subscriber or non-subscriber as represented in 40. In an exemplary embodiment, the subscriber data includes caller ID information associated with the subscriber. This caller ID information includes caller ID for each phone the subscriber uses to access the ESP 12. If the caller ID of the incoming call received in step 34 matches the subscriber data that is accessed in step 38, then the caller is the subscriber.

Alternatively, the caller can be identified as the subscriber by entering a password that is verified by the ESP 12. In this case, password information associated with the subscriber is stored in the data storage device 24 shown in FIG. 1. The ESP in step 38 accesses this password information. The ESP 12 then compares the password entered by the caller with the password associated with the subscriber stored in the ESP 12. If the passwords match then the caller is the subscriber. Conversely, if the password entered by the caller does not match the password stored in the subscriber data then the caller is not the subscriber.

In the case where the caller is the subscriber, the caller can then use the ESP 12 to further process the call. In one exemplary embodiment, the subscriber can make an outbound call. This outbound call is initiated by the subscriber by entering a destination telephone number as represented by 42. The ESP 12 will enable the recording of voice content associated with the call if set as a record preference in the subscriber data as represented by step 44. The subscriber sets up a recording preference, which indicates whether or not the ESP 12 will record voice content of the call. This recording preference is stored in the data storage 24 shown in FIG. 1 is accessed in step 38 of FIG. 2. Once the recording preferences set, then the ESP 12 will handle all calls according to the preference.

The ESP 12 then dials a telephone number, which is the destination of the outbound call entered in step 42 as represented by step 46. The subscriber is then connected to the destination of the outbound call. If recording is enabled by the record preference, then the voice content of the call between the subscriber and the destination party of the outbound call will be recorded as a voice file. This voice file is either stored on the data storage device 24 or is delivered in some other fashion specified in the subscriber data as represented by step 48.

A delivery preference for call voice content can be specified by the subscriber and stored in the data storage device 24. The delivery preference information is accessed in step 38. Once the conversation is complete, the call voice content file is then delivered according to the subscriber delivery preference. This delivery preference can include a variety of delivery methods such as storing the voice file in the data storage device 24 for access later by the subscriber. Alternatively, the voice file can be delivered to a destination outside of the ESP 12 such as delivering the voice file to an email location on the Internet. In this case, the voice file is sent through the I/O device 28 and tagged with a destination email address.

Once the conversation is complete and the voice content file is delivered, the subscriber is delivered back to the beginning of the process as represented by step 34 and allowed to place additional calls, if desired.

For the case where the caller is not a subscriber in step 40, the call will be handled according to a different method as will be described. The ESP 12 provides the subscriber the ability to set the record preference for non-subscriber calls differently from the manner subscriber calls are handled. The record preferences for non-subscriber calls accessed in step 38 are used to enable the voice-recording feature in step 50. If the voice recordings for non-subscriber calls are enabled, then the call will be recorded. Conversely, if the call recording preferences are not enabled, the call will not be recorded.

In contrast to the case where the caller is a subscriber and allowed to enter a destination of the outbound call shown in step 42, in the case where the caller is a non-subscriber, the outbound calls are based on subscriber data as shown in step 52. The subscriber data that is accessed in step 38 specifies the outbound call numbers for the non-subscriber caller. The subscriber has the flexibility of configuring the ESP 12 to dial a particular number for the outbound call when a non-subscriber call is received. In this case, the subscriber has all non-subscriber calls forwarded to a certain destination telephone number or plurality of destination telephone numbers. The outbound call is then placed, connecting the non-subscriber caller to the destination telephone number(s) selected by the subscriber. The voice content of the call is recorded if call recording is enabled as discussed in step 50.

The call voice content or voice file of the previously made call is then delivered, based on the subscriber data. The subscriber data, accessed in step 38, provides delivery preferences for call voice content. These delivery preferences include a variety of delivery methods. One such delivery method is to deliver the voice file to a data storage device 24 for later access by the subscriber. Alternatively, the voice file can be delivered to a destination outside of the ESP 12 utilizing the I/O device 28 to deliver this voice file to an external device such as an email location on the Internet. Once the call is completed and the call recording is delivered, if recording is enabled, then the non-subscriber caller is allowed to begin the process again going back to step 34. The non-subscriber caller can either exit the system or perform additional methods as well be discussed further with respect to FIG. 7.

FIG. 3 is a graphical user interface for one exemplary embodiment of the ESP 12 that allows the subscriber to select recording preferences and destination preferences for incoming calls. The destination preference can be selected so that incoming calls from a non-subscriber will be transferred to a particular telephone number as discussed previously in step 52. This destination preference is set in box 56 of the graphical user interface whereby incoming calls are transferred to a primary number that was previously entered. The subscriber can conveniently change this destination preference by making a selection from a pull down menu.

An access code or password is selected by the subscriber as shown in box 58, which is stored as subscriber data. This access code is used by the ESP, in step 40 of FIG. 2, to determine whether or not a caller is a subscriber. The subscriber can set various delivery destinations as well as notifications that are stored in the subscriber data. The subscriber can select to be notified of incoming non-subscriber calls by entering an email address as shown in box 60. The subscriber can also choose to have the voice file or a link to the voice file provided in the email as a delivery option, as discussed previously with respect to steps 54 and 48 in FIG. 2.

Another notification option is to have a text message forwarded to a mobile number as represented by 62. In this case, a mobile service provider is selected using a pull down menu 64. Other options for handling inbound calls received on a subscriber number are to give the subscriber an option to take the call and select if the call is recorded. This call screening feature is implemented by announcing to the subscriber that a call is coming in on a certain subscriber number and the subscriber can select to take the call and record, take the call and not record or have the call forwarded to a different primary number previously stored as represented by 66.

Alternatively, as represented by 68, the inbound non-subscriber calls can be directly connected to a primary number. By selecting or checking the record option, the subscriber can selectively chose to have inbound calls to this particular subscriber number recorded as represented by 70. The subscriber can select an announce feature whereby the subscriber is notified which of these subscriber numbers the inbound call is coming in on as represented by 72.

In the case where a subscriber has a separate number that is managed by an auto attendant, the same types of options are available as previously discussed above. Similar numbering will be used to identify the similar selections. The auto attendant feature will be discussed in more detail with respect to FIG. 7.

FIG. 4 is an exemplary graphical user interface illustrating further detail of how a subscriber selects call destination preferences for calls received by non-subscribers. In box 74, the subscriber selects a primary number and ring options for calls transferred to the primary number. As shown previously in FIG. 3, where incoming calls are transferred to a primary number that particular primary number is set up in box 74 of FIG. 4.

Figure 5:
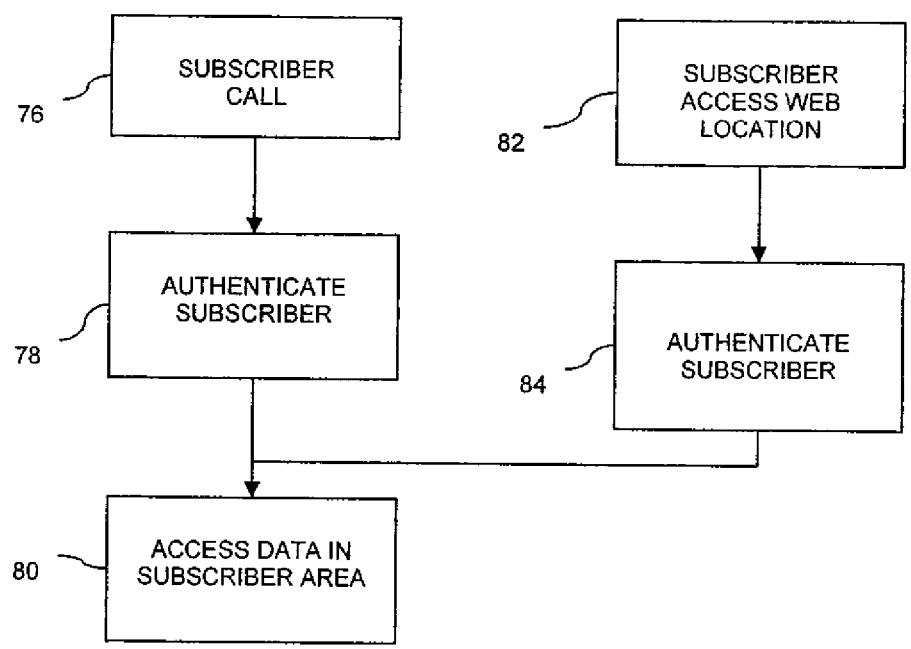
FIG. 5 is a flow chart of methods for a subscriber to access voice recordings data either by calling in to access by phone or accessing via a web location.

FIG. 5 is a flow diagram showing one exemplary method performed by the ESP 12 for allowing subscriber access to voice files stored in the data storage device 24.

One method to access voice files is through the telephony service interface 14, 16. Using this method, the subscriber calls either the subscriber number or a special access number that is provided as represented by step 76. The subscriber must be authenticated as represented by step 78. As discussed previously, authentication can be accomplished by comparing the caller ID of the caller to see if it matches a caller ID of the subscriber list. Alternatively, the subscriber may be prompted to enter a password. A comparison is done to see if this password corresponds to the password stored for this subscriber. Other techniques can be used as well to verify the caller's credentials. Once authenticated, the subscriber can access data in the subscriber area of data storage device 24.

Alternatively, a subscriber can access subscriber data on the data storage device 24 using the web interface 18. In this case, the subscriber need only have access to a suitable web interface such as a web browser. The subscriber enters a web address for accessing the ESP 12. An access page prompts the subscriber for sufficient credentials to authenticate the subscriber as represented by step 84. In one exemplary embodiment, the credentials are a password that is then compared to a password stored in the subscriber's data storage area to determine if access should be granted. If access is granted, the subscriber is allowed to access data in the subscriber area as represented by step 80.

Access to the subscriber data allows the subscriber to change configurations such as destination preferences, recording preferences, and deliver preferences. In addition, the subscriber can change various administrative options such as passwords and primary numbers.

The subscriber can also access voice files, which are stored in the subscriber data storage area 24. The voice files in the data storage area can be organized in a hierarchical file structure making access to particular voice files easier.

Figure 6:
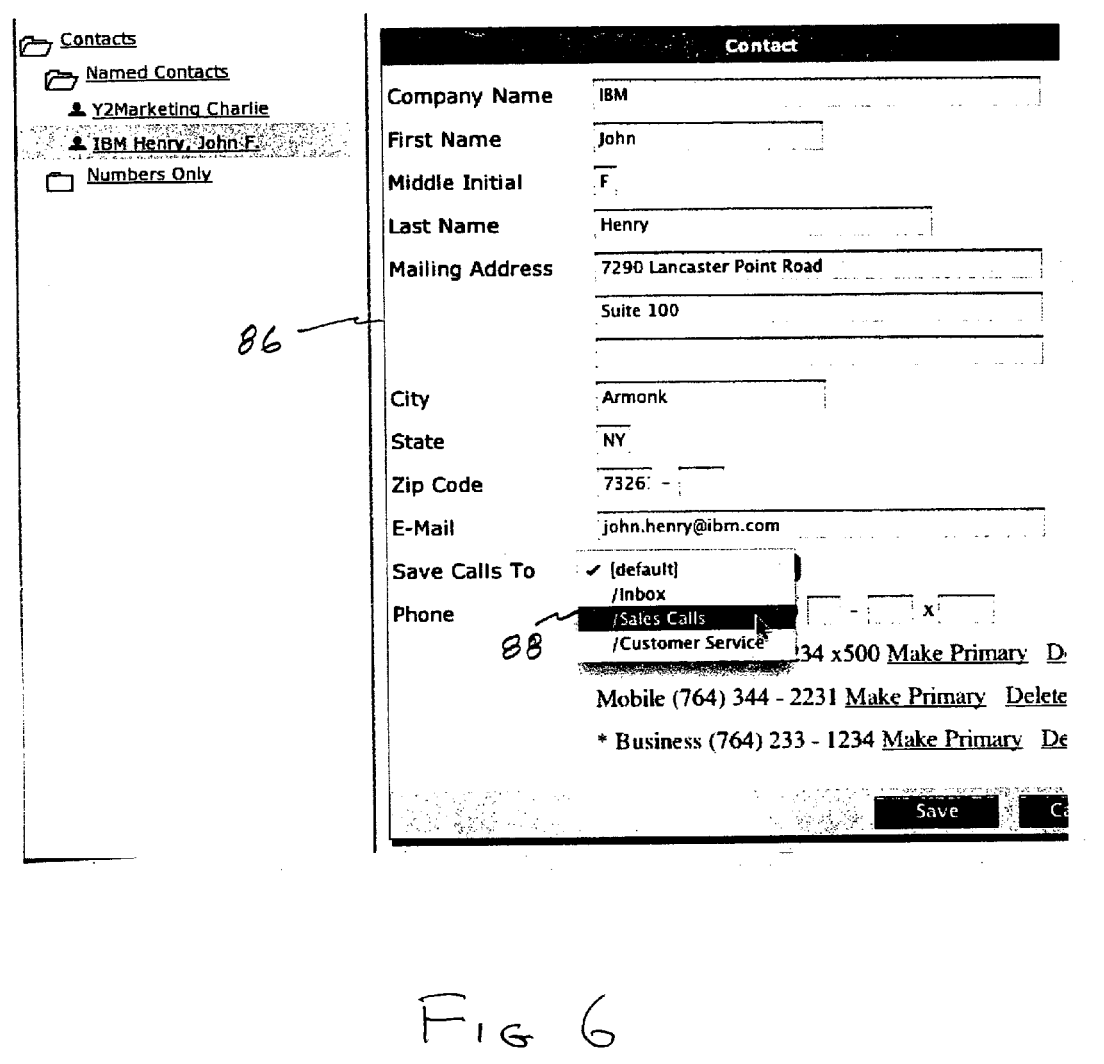

FIG. 6 is one exemplary embodiment of a graphical user interface for selecting delivering options for saving voice files. A contact is identified in box 86 for that particular contact identified in 86, an option to save calls or voice recordings for calls to or from that contact can be selected. In this case, all calls made to or from John Henry will be recorded and the voice files will be saved in a directory under "Sales Calls." In this manner, special delivery of these voice files involving this individual will take place. Furthermore, the subscriber can specify the location within the file structure for these voice files to be stored. The subscriber organizes voice files using this technique for easy retrieval.

Figure 7:
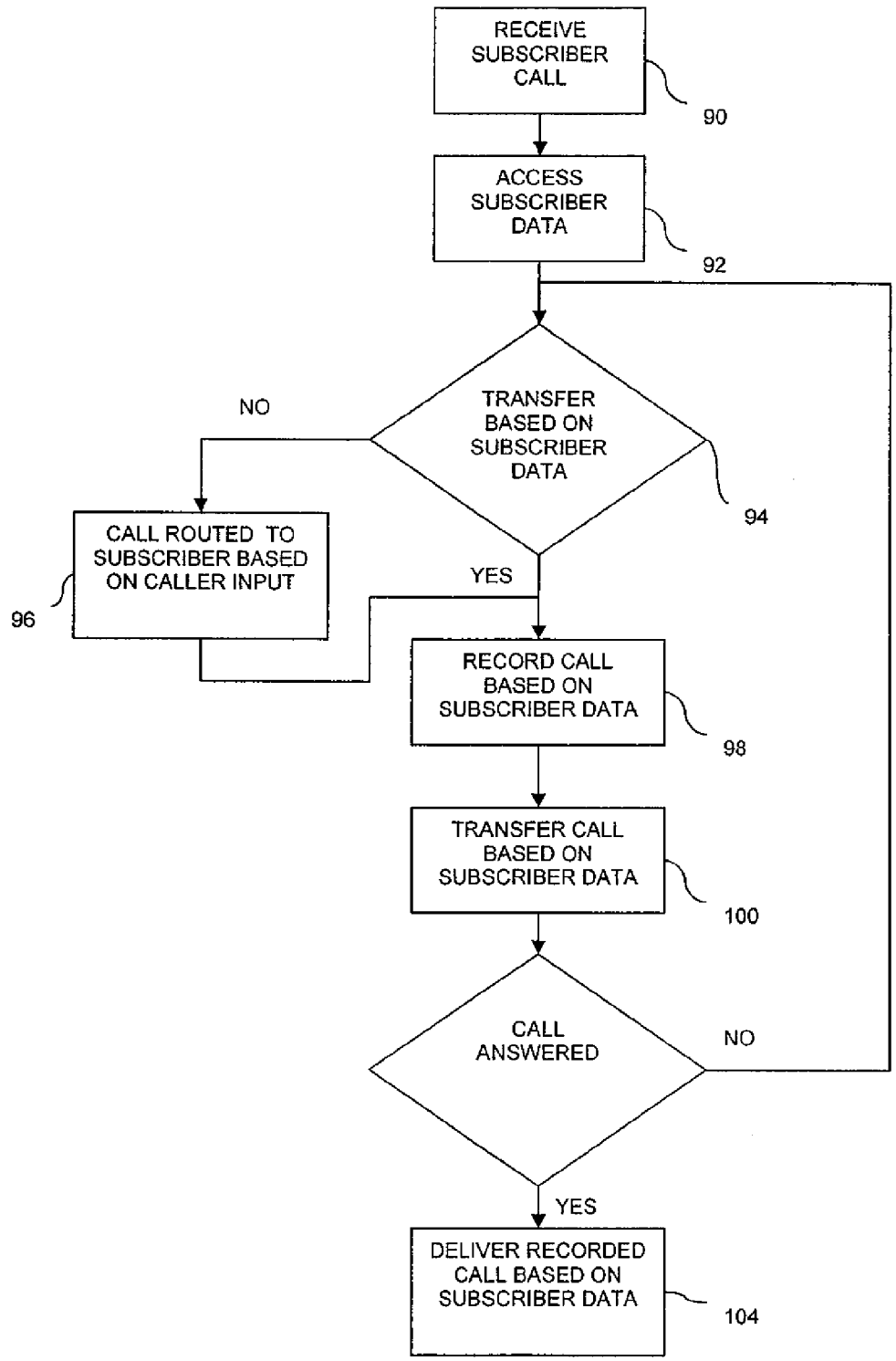
FIG. 7 is a flow chart of a call management feature for an auto attendant for transferring calls based on either subscriber or transferee's preference and recording calls based on subscriber preference.

FIG. 7 is a flow chart showing an exemplary embodiment of the method performed by the ESP 12 for handling calls using an auto attendant feature. Calls are received on a subscriber's auto attendant number as represented by step 90. Subscriber data relating to subscriber preferences is accessed as represented by step 92. Based on the subscriber data, the incoming call is either transferred to a number specified by the subscriber data or not transferred. If a call is not transferred, the caller is presented a menu of options from which the call is routed based on the caller selection as represented by step 96.

In either case, whether the call is to be directly transferred based on subscriber data in step 94 or if the call is to be routed based on caller input from step 96, the call is recorded in step 98 if the subscriber data specifies that the call to this destination should be recorded. The call is then transferred to the call destination specified in the subscriber data as represented by step 100. If the call is not answered, this process is repeated as represented by step 102. If the call is answered and the call is recorded, then the recorded call or voice data will be delivered as specified in the subscriber data as shown in step 104.

FIG. 8 is a graphical user interface for one exemplary embodiment of the auto attendant method described in FIG. 7. An incoming call that is placed on hold can be entertained with music or ads as shown in 106. Incoming calls are first transferred to a specific location before being routed to an auto attendant menu, which is presented in step 96 of FIG. 7. As shown in step 108, the call is forwarded to group sales for at least three rings before the call is forwarded to the auto attendant menu. The auto attendant menu is shown in box 110. In box 110 the subscriber can select different options that are presented to the caller. The caller enters the digit corresponding to the option desired.

The exemplary embodiment of the present invention illustrates a device and method for recording voice conversations and organizing these voice files in a manner that are readily accessed. The system can be used on a subscriber basis so that the subscriber does not need to purchase expensive hardware or software. Furthermore, the system is configured to overlay existing technologies, thereby not requiring the subscriber to purchase dedicated telephone equipment.

What is claimed is:

1. A call recording method for allowing a subscriber to selectively record calls made to the subscriber from callers, the method comprising:

receiving a call at an enhanced service platform from a caller using a telephone number associated with the subscriber;

announcing to the subscriber that the call is coming in on the telephone number associated with the subscriber;

accessing a database associated with the subscriber to determine recording preference and call destination preference, wherein the database further includes a recording delivery preference for specifying a delivery target for the recorded call and the recording delivery preference is one of delivery by email, storage for access by telephone, or storage for access through a web browser;

routing the call based on the call destination preference; and recording, with the enhanced service platform, call voice content between the subscriber and the caller in a subscriber data storage area of the database based on the subscriber recording preference stored in the database, wherein the recording is responsive to the announcing to the subscriber that the call is coming in.

2. The method for call recording of claim 1 wherein the telephone number associated with the subscriber is one of a plurality of telephone numbers associated with the subscriber.

3. The method for call recording of claim 1 wherein the recording preference is based on one of the telephone numbers dialed, the subscriber identity and caller input to the enhanced service platform.

4. The method for call recording of claim 1 wherein prior to receiving a call the step of configuring a recording preference and a delivery preference that is associated with the subscriber.

5. The method for call recording of claim 1 wherein the call destination preference is a plurality of call destinations specified by one of the telephone numbers dialed, the subscriber identity, time of call and caller input to the enhanced service platform.

6. The method for call recording of claim 1 wherein the enhanced service platform has a plurality of subscribers associated therewith and wherein each subscriber has a recording preference and a call destination preference stored in the database.

7. The method for call recording of claim 1 wherein the call is answered by the enhanced service station and wherein the caller makes a selection from a plurality of choices and whereby the selection is associated with the subscriber.

8. A call recording method for allowing a subscriber to selectively record calls made to the selected subscriber from callers, the method comprising:

receiving a call at an enhanced service platform from a caller using a telephone number associated with the subscriber;

announcing to the subscriber that the call is coming in on the telephone number associated with the subscriber;

accessing a database associated with the subscriber to determine recording preference and call destination preference, wherein the database further includes a recording delivery preference for specifying a delivery target for the recorded call and the recording delivery preference is one of delivery by email, storage for access by telephone, or storage for access through a web browser;

routing the call based on the call destination preference;

recording, with the enhanced service platform, call voice content between the subscriber and the caller in a subscriber data storage area of the database based on the subscriber recording preference stored in the database, wherein the recording is responsive to the announcing to the subscriber that the call is coming in; and delivering the recorded call voice content to a data storage area.

9. The call recording method of claim 8 wherein the destination preference is a plurality of destinations each selected by the subscriber and wherein the destination of the call is a destination selected from the plurality of destinations based on input from the caller.

10. A call recording method for allowing a subscriber to selectively record calls made to the subscriber from callers, the method comprising:
- receiving a call at an enhanced service platform from a caller using a telephone number associated with the subscriber;
- selecting the subscriber from the plurality of subscribers based on caller input;
- announcing to the subscriber that the call is coming in on the telephone number associated with the subscriber;
- accessing a database associated with the subscriber to determine recording preference and call destination preference, wherein the database further includes a recording delivery preference for specifying a delivery target for the recorded call and the recording delivery preference is one of delivery by email, storage for access by telephone, or storage for access through a web browser;
- routing the call based on the call destination preference;
- recording, with the enhanced service platform, call voice content between the subscriber and the caller in a subscriber data storage area of the database based on the subscriber recording preference stored in the database, wherein recording is responsive to the announcing to the subscriber that the call is coming in; and
- delivering the recorded call voice content based on the call delivery preference.

11. A call recording method for allowing a subscriber to selectively record calls made to the subscriber from callers, the method comprising:
- receiving a call at an enhanced service platform from a caller using a telephone number associated with the subscriber, wherein the telephone number is a selected telephone number of a plurality of telephone numbers;
- announcing to the subscriber that the call is coming in on the selected telephone number associated with the subscriber;
- accessing a database associated with the subscriber to determine recording preference and call destination preference, wherein the database further includes a recording delivery preference for specifying a delivery target for the recorded call and the recording delivery preference is one of delivery by email, storage for access by telephone, or storage for access through a web browser;
- routing the call based on the call destination preference;
- recording, with the enhanced service platform, call voice content between the subscriber and the caller in a subscriber data storage are of the database based on the subscriber recording preference stored in the database, wherein recording is responsive to the announcing to the subscriber that the call is coming in; and
- delivering the recorded call voice content based on the call delivery preference.

* * * * *